United States Patent
Towley, III et al.

(10) Patent No.: US 9,289,638 B2
(45) Date of Patent: Mar. 22, 2016

(54) EXERCISE EQUIPMENT FRAME HAVING SECTIONAL STRUCTURAL MEMBERS

(71) Applicants: Carl K. Towley, III, Alexandria, MN (US); Gregory S. Olson, Owatonna, MN (US)

(72) Inventors: Carl K. Towley, III, Alexandria, MN (US); Gregory S. Olson, Owatonna, MN (US)

(73) Assignee: PowerBlock Holdings, Inc., Owatonna, MN (US)

( * ) Notice: Subject to any disclaimer, the term of this patent is extended or adjusted under 35 U.S.C. 154(b) by 93 days.

(21) Appl. No.: 14/015,510

(22) Filed: Aug. 30, 2013

(65) Prior Publication Data

US 2015/0065316 A1     Mar. 5, 2015

(51) Int. Cl.
| | |
|---|---|
| A63B 21/078 | (2006.01) |
| A63B 21/00 | (2006.01) |
| A63B 17/04 | (2006.01) |
| A63B 23/12 | (2006.01) |
| F16B 7/10 | (2006.01) |

(52) U.S. Cl.
CPC ........... *A63B 21/00047* (2013.01); *A63B 17/04* (2013.01); *A63B 21/078* (2013.01); *A63B 23/1218* (2013.01); *F16B 7/105* (2013.01); *A63B 2225/093* (2013.01)

(58) Field of Classification Search
CPC .. A63B 21/00047; A63B 21/078; A63B 3/00; A63B 21/00
USPC ......... 482/23, 35, 36, 38, 41, 42, 92–94, 104, 482/148
See application file for complete search history.

(56) References Cited

U.S. PATENT DOCUMENTS

| | | | | |
|---|---|---|---|---|
| 3,861,215 A | | 1/1975 | Bradley | |
| 3,948,513 A | * | 4/1976 | Pfotenhauer | A63B 1/00047 482/142 |
| 4,306,715 A | * | 12/1981 | Sutherland | A63B 21/078 482/104 |
| 4,408,759 A | * | 10/1983 | Reneau | A63B 21/012 482/114 |
| 4,415,150 A | * | 11/1983 | Iezza | A63B 3/00 211/182 |
| 4,729,561 A | | 3/1988 | Desjardins | |
| 4,856,773 A | * | 8/1989 | Deola | A63B 21/0628 482/102 |
| 4,955,604 A | * | 9/1990 | Pogue | A63B 21/0783 482/106 |
| 5,082,260 A | * | 1/1992 | Dinelli | A63B 21/078 482/104 |
| 5,105,803 A | * | 4/1992 | Burton | A61H 1/0218 482/143 |
| 5,286,241 A | * | 2/1994 | Petrakis | A63B 69/205 482/83 |
| 5,306,220 A | * | 4/1994 | Kearney | A63B 23/00 482/104 |
| 5,318,493 A | | 6/1994 | Brady | |
| 5,346,448 A | * | 9/1994 | Sollo | A63B 21/00181 482/104 |
| 7,070,546 B1 | * | 7/2006 | Grasso | A63B 21/072 482/103 |
| 7,731,631 B2 | * | 6/2010 | Collias | A63B 21/0783 482/23 |

* cited by examiner

*Primary Examiner* — Stephen Crow
*Assistant Examiner* — Garrett Atkinson
(74) *Attorney, Agent, or Firm* — James W. Miller

(57) ABSTRACT

An exercise equipment frame, such as a power cage, is formed from uprights that comprise at least two sections that are telescopically interfit with one another. The sections have an interference fit between them when the telescopic interconnection is made that is tight enough to require the use of a tool that enables leverage greater than that achievable by the hand pressure of a user. The sections may be of substantially equal length to one another when forming the main uprights of the frame to allow packaging of the sections when disassembled in a carton of more regular dimensions. The sections may also be unequal length to allow coupling of a frame extension to the top of a completed power cage type frame.

17 Claims, 7 Drawing Sheets

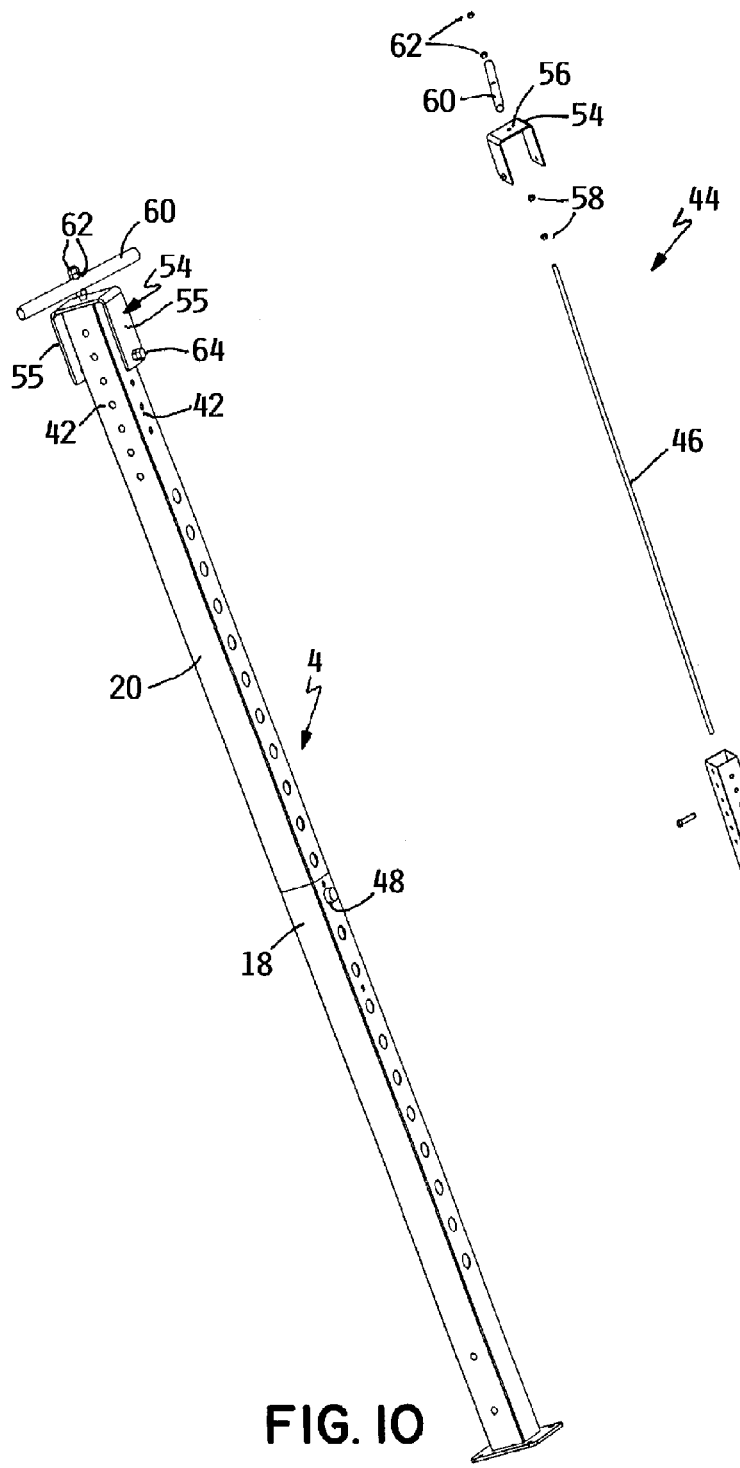
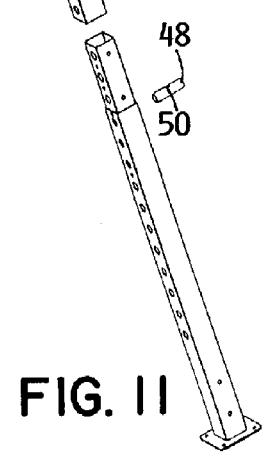
FIG. 10
FIG. 11

EXERCISE EQUIPMENT FRAME HAVING SECTIONAL STRUCTURAL MEMBERS

TECHNICAL FIELD

This invention relates to the exercise equipment field and, more particularly, to a frame for holding or racking weights, such as barbells, used in weight lifting exercises or for supporting other exercise devices, such as chin up bars, thereon.

BACKGROUND OF THE INVENTION

Weight lifting exercises are often performed with a barbell. A barbell includes an elongated grip bar that is long enough for a user to grip the central portion of the grip bar with both hands. The bar when so gripped is also long enough to extend horizontally and laterally outside of or beyond the shoulders of the user, i.e. the bar has a length that is substantially longer than the shoulder width of the user. A selected number and/or size of weights can be loaded onto each of the ends of the bar such that a desired total exercise mass is provided by the barbell. The user may then lift and lower the barbell to perform different types of exercises, such as a bench press, a squat, etc.

Various types of free standing or wall mounted frames are known in the art for supporting the grip bar of the barbell while the ends of the grip bar are being loaded or unloaded with the desired weights. Such frames are also used to hold or support a fully loaded barbell to allow the user to rack the barbell onto the frame or cage at the end of a set of weight lifting repetitions. This allows the user to rest and recover before beginning the next set of repetitions. This also allows the user a convenient place to rack the barbell in the event the user is not physically able to complete the current set of repetitions.

Such frames usually have at least one pair of spaced, parallel uprights that extend vertically over a significant length, i.e. 8 to 12 feet tall. In some frames known in the art as power cages, there are two pairs of spaced, parallel uprights arranged at the four corners of a square or rectangular configuration. One pair of uprights in such a frame usually carries a series of vertically spaced holes along at least one side of each upright in the pair with the holes extending along most of the vertical length of each upright. In many cases, the holes in each upright are carried on two opposite sides of each upright rather than just on one side. The holes are spaced apart at substantially equal intervals relative to one another, i.e. at intervals of 3 to 4 inches from one another.

The holes in the uprights of this pair of uprights often carry a bar support on each upright such that the grip bar of the barbell may be dropped down onto the pair of bar supports to rack the barbell on the frame. Many conventional bar supports have a horizontal mounting pin that extends through a first hole in one side of an upright, through the open interior of the upright, and then out through a corresponding hole in the opposite side of the upright to releasably connect one bar support to the upright. The height at which the barbell is racked on the frame is adjustable by picking different vertical elevations for the pair of holes in the uprights that are used to carry the pair of bar supports. When a pair of bar supports is mounted in the fashion described above to each upright in the pair of uprights, the laterally spaced bar supports will have upwardly facing cradles in which the grip bar of the barbell is retained when the barbell in lowered down into engagement with the bar supports. Such bar supports are often referred to as J-bar rests or J-bar cups.

In known weight lifting frames used to support barbells, the uprights are typically formed of a plurality of hollow steel tubes provided as single pieces having a length equal to the desired height of the frame. When the frames are 8 to 12 feet tall, the tubes that form the uprights are cut into the lengths equal to the desired height, i.e. the tubes will also be 8 to 12 feet tall. This poses various packing and shipping problems. For example, a single weight lifting frame might be packaged and shipped in a cardboard box or carton that might be four feet wide, twelve feet long, but only ten inches high. This encourages freight companies to pack other heavy loads on top of such a vertically short carton, thereby causing damage to the components of the weight lifting frame carried inside the carton including denting or bending the steel tubes. Such damage is obviously undesirable as either the manufacturer or the freight company is liable for replacing any damaged components.

It would be an advance in the art to provide a weight lifting frame that could be shipped in a carton that would have be shorter in length and taller in height, thereby having a more uniform appearance along the width, length and height dimensions, to decrease the incidence of shipping damage. However, the components of such a weight lifting frame carried in such a carton when assembled should provide substantially the same degree of strength and rigidity as a traditional frame in which the uprights are formed as one piece tubes and also allow the bar supports to be adjustably coupled to the uprights in the usual manner.

SUMMARY OF THE INVENTION

One aspect of this invention relates to an exercise equipment frame. The frame comprises a pair of spaced, parallel, vertically extending uprights that are fixedly secured to one another by at least one cross member. Each upright comprises a hollow tube. Each upright has at least a pair of opposite sides having matching arrays of vertically spaced apart holes carried thereon. The holes provide a series of a plurality of vertically spaced apart hole pairs on each upright with each hole pair comprising a first hole on one side of the upright and a second hole on the opposite side of the upright with the first and second holes of the hole pair being at the same vertical elevation along the upright. A pair of elongated horizontal attachment members pass through vertically corresponding hole pairs on the pair of uprights. Each upright is formed from at least two separable sections that separate from one another at some vertical location between upper and lower ends of the series of hole pairs on the upright. One of the two separable sections has a reduced size end that is telescopically interfit into one end of the other section to couple the two sections together. The reduced size end of the one section has hole pairs therein that will align with and form continuations of the hole pairs in the one end of the other section when the telescopically interfitting connection between the two sections is fully made. In addition, the reduced size end of the one section and the one end of the other section will have an interference fit therebetween when the sections are telescopically interfit with one another which is sufficiently tight such that the sections can be telescopically interfit with one another only by using a force that is greater than the force a user can exert using hand pressure to push the sections together.

BRIEF DESCRIPTION OF THE DRAWINGS

This invention will be described more specifically in the following Detailed Description, when taken in conjunction with the following drawings, in which like reference numerals refer to like elements throughout.

FIG. 10 is a perspective view of one of the assembled uprights of the frame of FIG. 1, particularly illustrating a disassembly tool installed on the assembled upright which is used for pulling apart the upper and lower sections of the assembled upright from one another;

FIG. 11 is a perspective view similar to FIG. 10, but illustrating the disassembly tool in an exploded form relative to the assembled upright.

DETAILED DESCRIPTION

Figure 1:
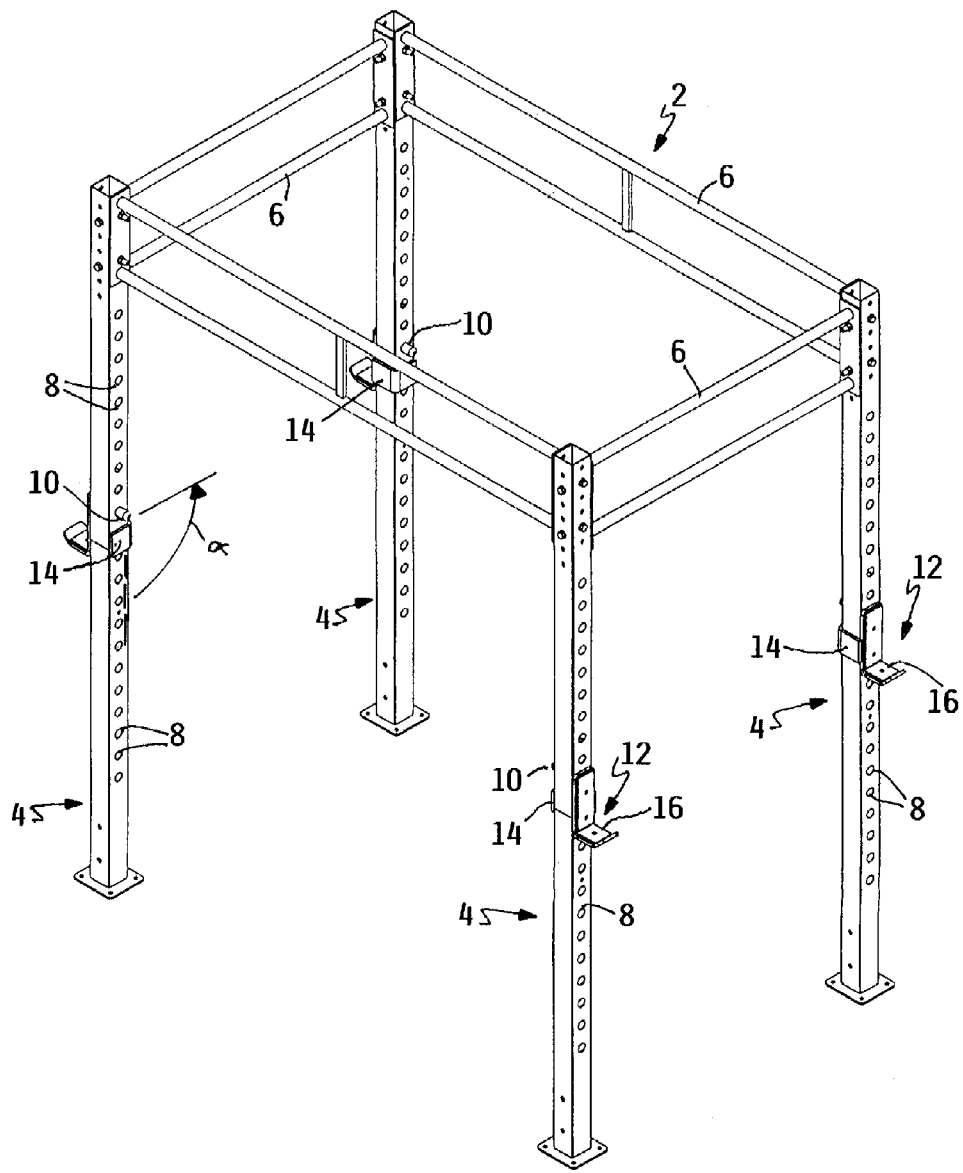
FIG. 1 is a perspective view of a typical weight lifting frame that may use the sectional structural members of this invention to form at least the vertical uprights of a frame.

Referring first to FIG. 1, a weight lifting frame according to one embodiment of this invention is generally illustrated as 2. Frame 2 depicted in FIG. 1 is a free standing frame, often referred to as a power cage, having four vertical uprights 4. Uprights 4 are positioned at the four corners of the cage structure. Uprights 4 are rigidly connected together at the top thereof by a plurality of laterally and longitudinally extending cross members 6 that are bolted to the upper ends of uprights 4 to form frame 2.

As also shown in FIG. 1, each upright 4 carries on two opposite sides thereof a plurality of large holes 8 that are vertically spread apart along a substantial portion of the length of upright 4 at substantially equal intervals. Large holes 8 permit the mounting pin 10 of a bar support 12, known as a J-cup, to pass through a first selected hole 8 on one side of upright 4, through the open interior of upright 4 since upright 4 is formed as a hollow tube, and then out the corresponding hole 8 on the opposite side of upright 4. This pin insertion is done when J-cup 12 is rotated 90° around the axis of mounting pin 10 as indicated by the angle α in FIG. 1 so that a locking flange 14 located on J-cup 12 below mounting pin 10 is clear of upright 4 such that locking flange 14 does not obstruct the pin insertion. After the pin insertion is accomplished, J-cup 12 is released and swings by gravity to the position shown in FIG. 1 in which locking flange 14 wraps around a portion of upright 4. Each J-cup 12 includes an upwardly facing cradle 16 suited for holding the grip bar (not shown) of a barbell (not shown) such that a laterally spaced pair of J-cups 12 support the barbell on frame 2.

Figures 2, 3, 4:
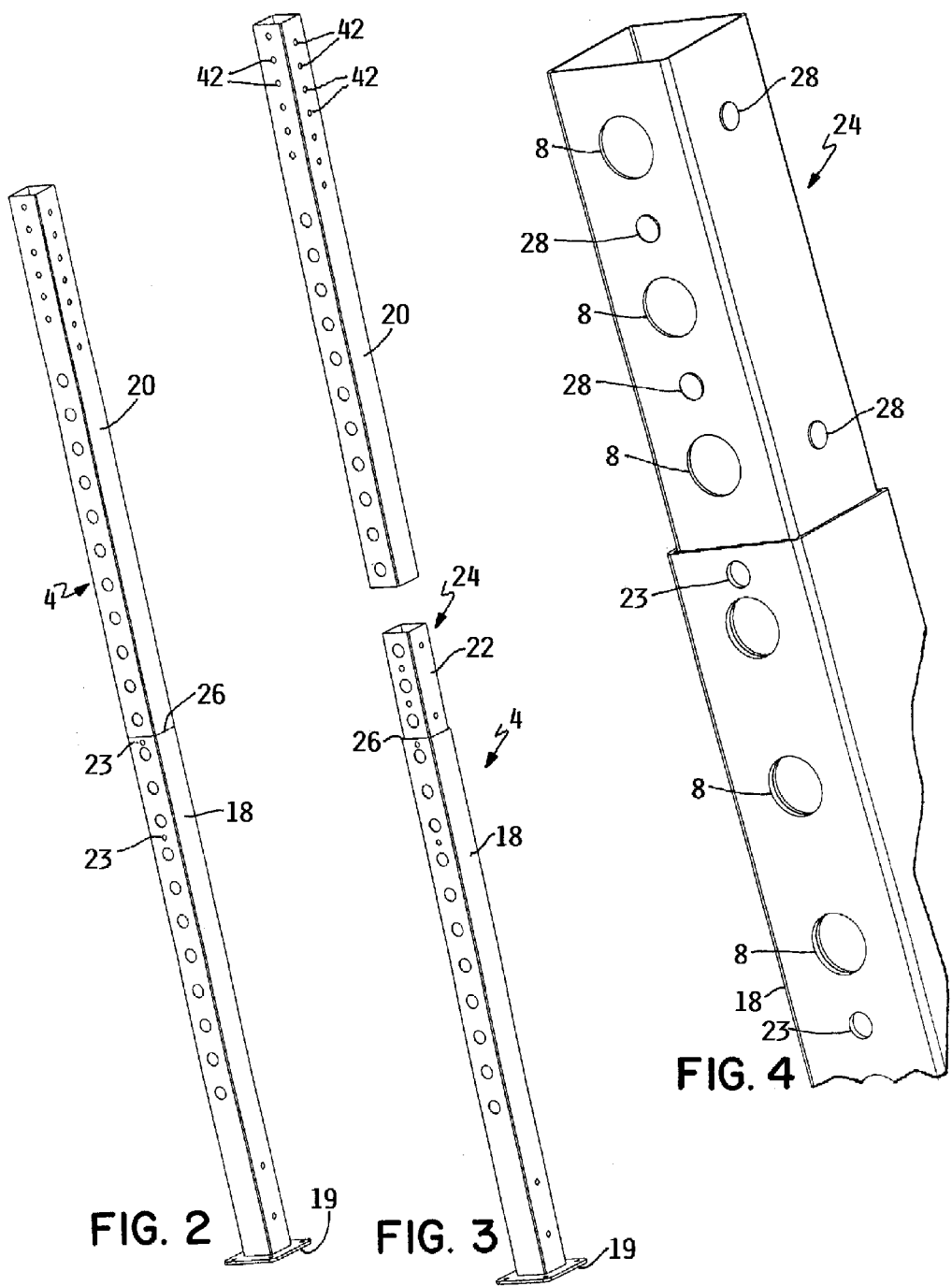
FIG. 2 is a perspective view of a sectional structural member according to one embodiment of this invention.
FIG. 3 is a perspective view of the structural member of FIG. 2, particularly illustrating the structural member in an exploded form with the upper section of the structural member having been pulled away from the lower section of the structural member.
FIG. 4 is an enlarged perspective view of a portion of FIG. 3, particularly illustrating the interference fit protrusions formed on a reduced size upper end of the lower section of the structural member which upper end is telescopically inserted into a lower end of the upper section of the structural member to rigidly and securely connect the upper and lower sections of the structural member together when the telescopic insertion is completed.

Referring now to FIGS. 2-4, uprights 4 of frame 2 shown in FIG. 1 are preferably identical to one another with each upright 4 being made as a sectional structural member. Accordingly, a description of one upright 4 will suffice to describe the other uprights 4.

Upright 4 preferably comprises at least a lower section 18 and an upper section 20. Sections 18 and 20 are preferably substantially equal to one another in length so that each section 18 and 20 provides about ½ of the vertical height of upright 4. Each section 18 and 20 is made of a length of hollow tubing, preferably of steel or some other suitably strong material. The lengths of hollow tubing which form sections 18 and 20 also have substantially identical cross-sections, e.g. a square cross-section. The lower end of lower section 18 includes an enlarged foot 19 for resting atop a floor or other support surface. The ends of upper section 20 are open.

As best shown in FIGS. 3 and 4, the upper end of lower section 18 of upright 4 includes a short connecting tube 22 having a similar cross-sectional shape as lower section 18 but being slightly smaller in size than lower section 18. Connecting tube 22 has a lower portion that is telescopically inserted into the rest of lower section 18. Thereafter, connecting tube 22 is welded in place within the rest of lower section 18 by a plurality of welds 23 to form an integral portion of lower section 18. Essentially, connecting tube 22 forms a reduced size, upper end 24 on lower section 18.

Upper end 24 of lower section 18 is adapted to be telescopically inserted into the lower end of upper section 20 to couple sections 18 and 20 together to form a single upright. FIG. 3 shows sections 18 and 20 of upright 4 separated from one another prior to telescopic insertion of upper end 24 of lower section 18 into upper section 20. FIG. 2 shows sections 18 and 20 after full telescopic insertion has been accomplished. In this event, sections 18 and 20 come into substantially abutting engagement along a parting line 26.

As best shown in FIG. 4, upper end 24 of lower section 18 also includes vertically spaced large holes 8 which will be aligned with the corresponding holes 8 in the lower end of upper section 20 when sections 18 and 20 are fully assembled together as shown in FIG. 2. The same is true of whatever portion of connecting tube 22 is contained inside the rest of lower section 18, i.e. the portion to which welds 23 are adhered, since such portion of connecting tube 22 must also have holes 8 that align with the corresponding holes 8 in the concentrically surrounding portion of lower section 18. This ensures that mounting pins 10 of J-cups 12 are able to completely pass through the interior cross-sections of sections 18 and 20 of upright 4 including those portions that would otherwise have been obstructed by connecting tube 22. Such passage is possible because connecting tube 22 is provided with enough holes 8 located in the proper places to form continuations where necessary in the holes 8 in sections 18 and 20 of upright 4.

Referring further to FIG. 4, in upper end 24 of lower section 18 of upright 4, each of the four sides of lower section 18 is provided with a pair of raised, outwardly extending, substantially circular protrusions 28. On a first side of upper end 24 of lower section 18 that does not carry any holes 8, two such protrusions 28 are shown vertically spaced apart from one another. On the second side of upper end 24 of lower section 18 that does have holes 8, two such protrusions 28 are similarly provided, though such protrusions 28 are not spaced as vertically far apart as the first pair of protrusions in order to fit protrusions 28 in between the spacing of holes 8. The other two sides of upper end 24 of lower section 18 that are hidden in FIG. 4 carry similarly located pairs of protrusions. Thus, there are a total of eight raised protrusions 28 that protrude outwardly from the four sides of upper end 24 of lower section 18, though the shape, number and spacing of protrusions 28 could be varied.

Figures 5A, 5B, 5C:
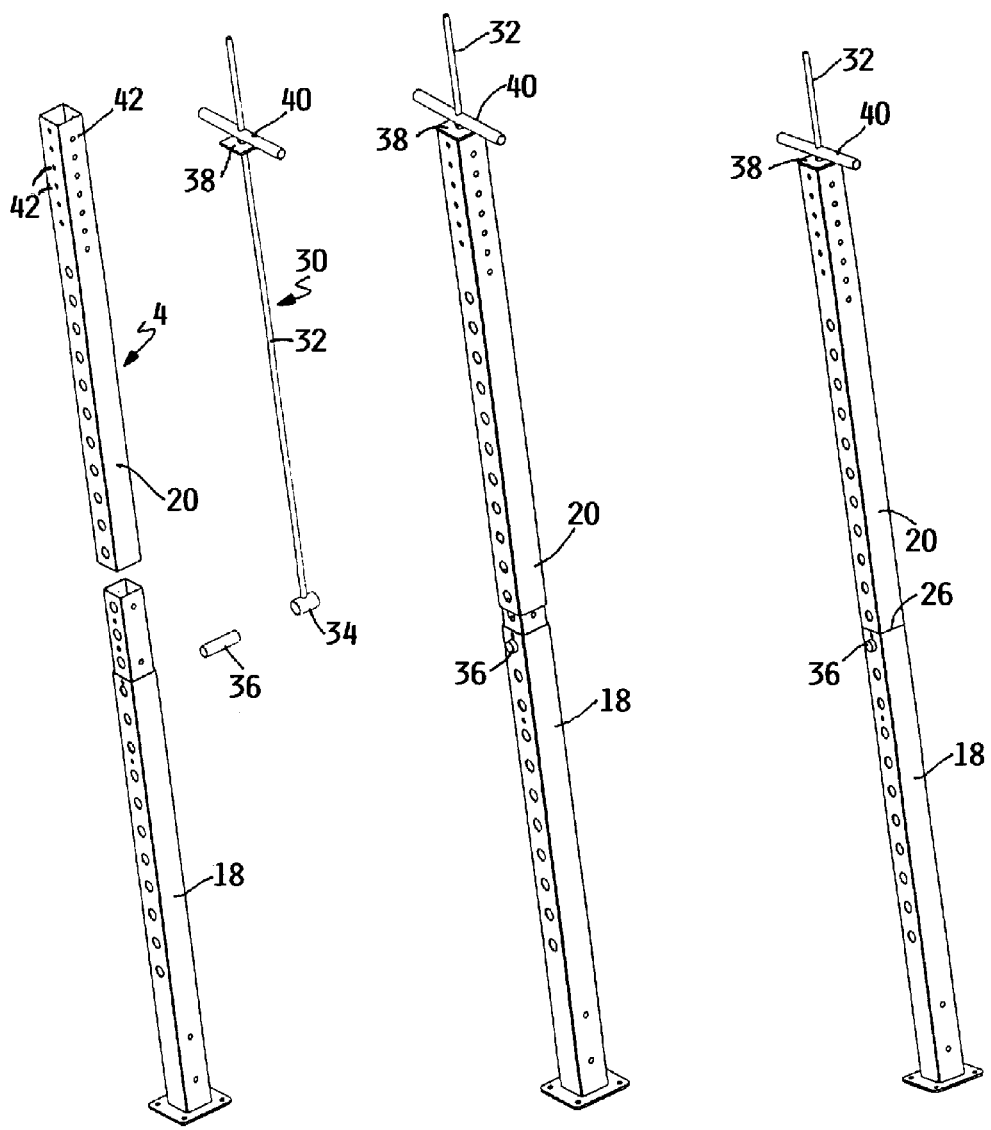
FIGS. 5A-5C are perspective views showing an assembly tool for using in achieving full telescopic insertion of the upper and lower sections of the structural member and the steps for using such assembly tool.

The amount by which protrusions 28 are raised and extend outwardly relative to the sides of the upper end of lower section 18 of upright 4 is chosen to create a tight interference fit with the lower end of upper section 20 of upright 4. This interference fit is tight enough that the user cannot telescopically assemble or disassemble lower and upper sections 18 and 20 of upright 4 from one another using hand pressure only. In 11 gauge tubing having a nominal gap of 0.021" between the peripheries of the parts having the telescoping fit, protrusions 28 should be raised between 0.023" and 0.029" to create such a tight, greater than hand pressure interference fit. Instead, an assembly tool, discussed hereafter in conjunction with FIGS. 5A-5C, is provided with frame 2 to allow an end user to assemble uprights 4 of frame 2 from their sections. Similarly, a disassembly tool, discussed hereafter in conjunction with FIGS. 10-11, is provided with frame 2 to allow an end user to disassemble uprights 4 of frame 2 to return the sections thereof to their disassembled form if so desired. The use of an interference fit that is greater than a fit that can be made or overcome by using hand pressure ensures a strong and substantially rigid connection between 18 and 20 that comprise upright 4 to allow frame 2 to be safely used in holding a barbell or in directly performing various exercises, such as chin-ups, thereon.

Turning now to FIGS. 5A-5C, the assembly tool is generally illustrated as 30. Assembly tool 30 comprises an elongated threaded rod 32 having a circular, horizontal sleeve 34 fixed to the lower end thereof. Rod 32 and sleeve 34 fixed thereto are sized to fit down into and through upper section 20 of upright 4 and into and through at least an upper portion of lower section 18 of upright 4. When so inserted and when sleeve 34 is aligned with one pair of large holes 8 in the upper portion of lower section 18, a cylindrical anchor pin 36 may be slid through the pair of holes and through sleeve 34 to temporarily affix sleeve 34, and thus the lower end of rod 32, to lower section 18.

FIG. 5A shows assembly tool 30 exploded outside of upright 4 for clarity in showing the components of assembly tool 30. FIG. 5B shows assembly tool 30 having been inserted into and through upper section 20 of upright 4 with sleeve 34 having been fixed by anchor pin 36 to lower section 18 of upright 4 in the set of holes immediately below upper end 24 of lower section 18. When so affixed, rod 32 extends upwardly to terminate in an upper end that is somewhat above the upper end of upper section 20 of upright 4 as shown in FIG. 5B.

The upper end of rod 32 carries a substantially flat thrust plate 38 that abuts against the top surface of the upper end of upper section 20 of upright 4. A rotatable handle 40 has a threaded bore or nut thereon which allows handle 40 to be threaded onto the screw threads of rod 32. When handle 40 is turned or rotated about the axis of rod 32 in the appropriate direction, handle 40 will be forced downwardly as it threads itself down along the threads of rod 32. In turn, the downward motion of handle 40 pushes down on thrust plate 38. This applies leverage that is substantially greater than that achievable by hand pressure to force the lower end of upper section 20 down over upper end 24 of lower section 18 despite the very tight interference fit being formed by protrusions 28.

FIG. 5B shows the telescopic insertion of upper section 20 having been partially made while FIG. 5B shows upper section 20 having been fully telescopically inserted over upper end 24 of lower section 18. After full telescopic insertion is achieved as shown in FIG. 5C, anchor pin 36 may be pushed and/or pulled out to one side of the pair of holes in which anchor pin 36 was temporarily received. Once anchor pin 36 is removed, the rest of assembly tool 30 may then be lifted upwardly out of upper section 20 of the now fully formed upright 4. This is an upright 4 in which sections 18 and 20 thereof are fully and completely joined to one another by a completed telescopic insertion as described above.

Obviously, in putting together or assembling a frame 2 of the type shown in FIG. 1, each upright 4 is assembled in the manner described in the preceding paragraph using assembly tool 30 on each pair of sections 18 and 20 in turn. Once the four uprights 4 are so formed, uprights 4 may be connected together by cross members 6 shown in FIG. 1. In this regard, the upper end of upper section 20 of upright 4 has relatively short arrays of vertically spaced small holes 42 on each of the four sides of the upper end of upper section 20. Small holes 42 are for the purpose of receiving the bolts that bolt cross members 6 to uprights 4 to form the completed power cage type of frame shown in FIG. 1.

Various advantages are provided by using a plurality of sections to form uprights 4 of frame 2. By using at least two sections 18 and 20 in each upright 4, very long uprights that would normally be 8 to 12 feet long are now formed by two sections that are only 4 to 6 feet long. This permits packing the components needed to assemble frame 2 into a package or carton that is only half the length and twice the height of the cartons previously needed when one piece uprights were provided. This decreases the likelihood of shipping damage since freight companies are less likely to stack other heavy times onto a carton that has more regular dimensions. In addition, despite the use of at least two sections 18 and 20 to form each upright 4, the series of large holes 8 in opposite sides thereof for securing J-cups 12 thereto remain the same as when one piece uprights were provided since there are no fasteners are used to secure sections 18 and 20 together. For all intents and purposes, uprights 4 function as they did before with the only visible evidence that different sections are used being the parting line 26.

Should the need arise to ever disassemble frame 2 to allow frame 2 to be removed or moved to another location, a disassembly tool 44 would be useful in overcoming the tight interference fit between sections 18 and 20 to pull sections 18 and 20 apart. Disassembly tool 44 is shown in FIGS. 10 and 11. Like assembly tool 30, disassembly tool 44 comprises a threaded rod 46 that is long enough to extend down and through upper section 20 of upright 4. A horizontal anchor pin 48 having a vertical threaded bore 50 extending therethrough is inserted through a selected pair of holes 8 in the upper portion of lower section 18. The lower end of rod 46 is threaded down into and through bore 50 in anchor pin 48 with the lower end of rod 46 extending downwardly a short distance below anchor pin 48. FIG. 11 shows anchor pin 48 and rod 46 disassembled from upright 4. FIG. 10 shows the two in an assembled condition in upright 4.

In the case of disassembly tool 44, a downwardly facing U-shaped bracket 54 has a hole 56 through which the upper end of rod 46 passes. A pair of jam nuts 58 is located on rod 46. Jam nuts 58 are tightened up into abutting engagement with the underside of the U-shaped bracket. A rotatable handle 60 having a threaded bore or nut is provided immediately above the top surface of bracket 54 with rod 46 passing upwardly through the threaded bore or nut in handle 60. Two additional jam nuts 62 are threaded onto rod 46 and are tightened atop handle 60. The vertically depending legs 55 of bracket 54 are fixedly bolted at 64 to some of the small holes 42 in the upper end of upper section 20 of upright 4 that are normally used for receiving the bolts that attach cross members 6. FIG. 10 shows disassembly tool 44 as installed at the beginning of an operation to disassemble upright 4.

When the user rotates handle 60 of disassembly tool 44 in the appropriate direction, rotation of handle 60 will cause rotation of rod 46 to screw rod 46 vertically upwardly relative to the lower threaded anchor pin 48 to cause rod 46 to lift upwardly. As rod 46 lifts upwardly, it carries with it bracket 54, which has a fixed vertical location on rod 46 due to the pairs of jam nuts 58 and 62. As bracket 54 is lifted upwardly, the bolted connection of legs 55 of bracket 54 to the sides of the upper end of upper section 20 will pull upwardly on upper section 20 with enough force or leverage to overcome the interference fit created by protrusions 28. If rotation of handle 60 continues far enough, the upward lifting of bracket 54 and the consequent upward lifting of upper section 20 will break the telescopic connection between sections 18 and 20 to cause sections 18 and 20 to become disassembled.

Referring now to FIGS. 6-9, an upwardly extending frame extension 70 is shown attached to frame 2. Frame extension 70 includes a pair of extension sections 72 that form continuations of the assembled upper and lower sections 18 and 20 that form a pair of uprights 4 of frame 2. Extension sections 72 of frame extension 70 are substantially identical to one another. Extension sections 72 support an array 74 of chin-up bars 76 thereon which are formed as a separate module having a pair of mounting flanges 78 that can be bolted to upper ends of extension sections 72 as most clearly shown in FIGS. 7 and 8. Bar array 74 is inclined vertically upwardly so that the different chin-up bars 76 will be at different vertical heights when frame extension 70 is coupled to frame 2. This better suits the needs of users of the equipment since a shorter user can use a lower chin-up bar 76 and a taller user can use a higher chin-up bar 76.

Figure 8:
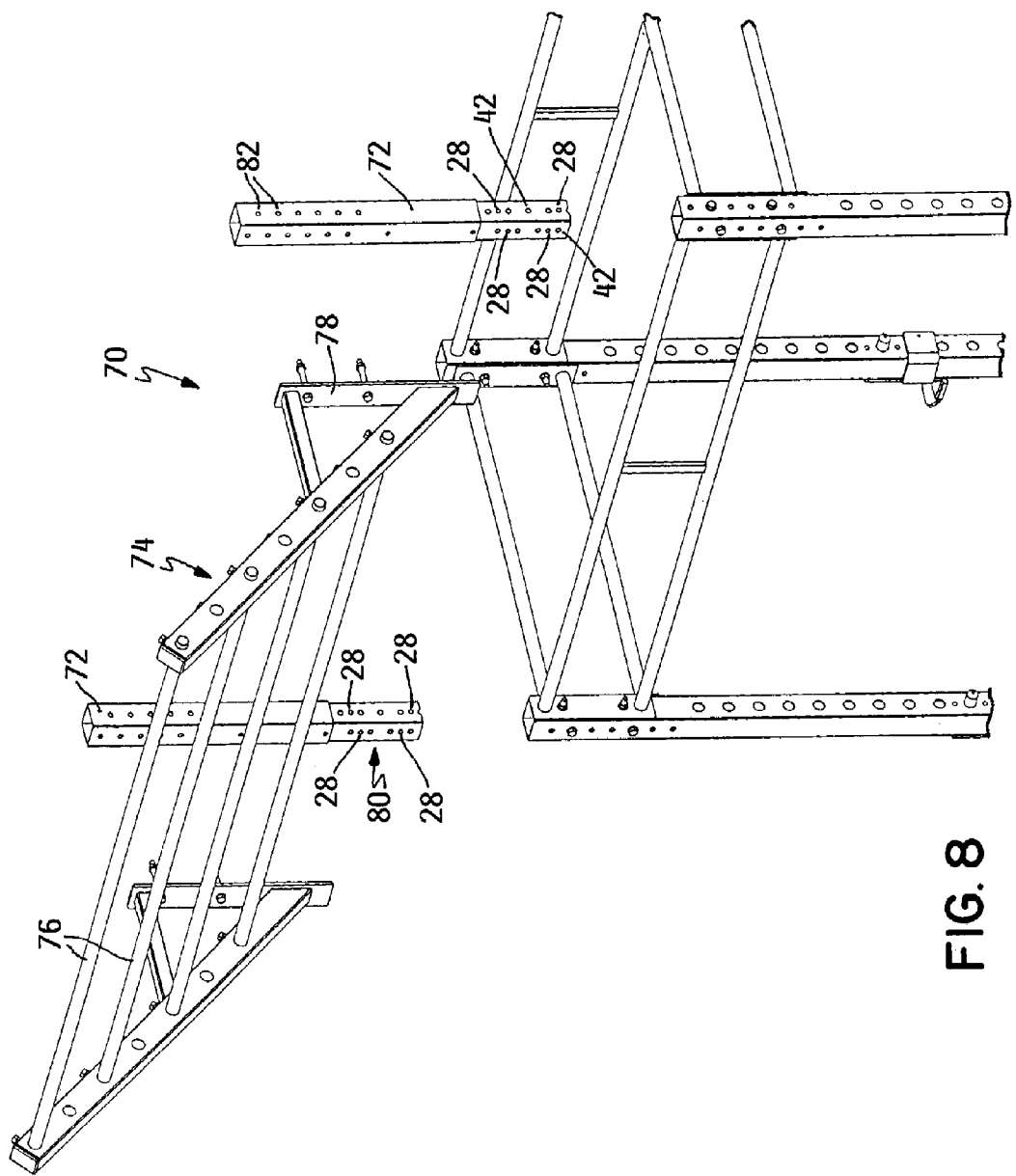
FIG. 8 is a perspective view of the upward frame extension of FIG. 7, but showing the array of pull up bars exploded away from the extension sections of the frame extension.

As best shown in FIG. 8, each extension section 72 of frame extension 70 is shaped much like that of lower section 18 of upright 4 of frame 2. However, extension section 72 is shorter than lower section 18 and is inverted in comparison to lower section 18 of frame 2. This allows a reduced size lower end 80 of extension section 72 to telescopically interfit with the upper end of upper section 20.

Figure 7:
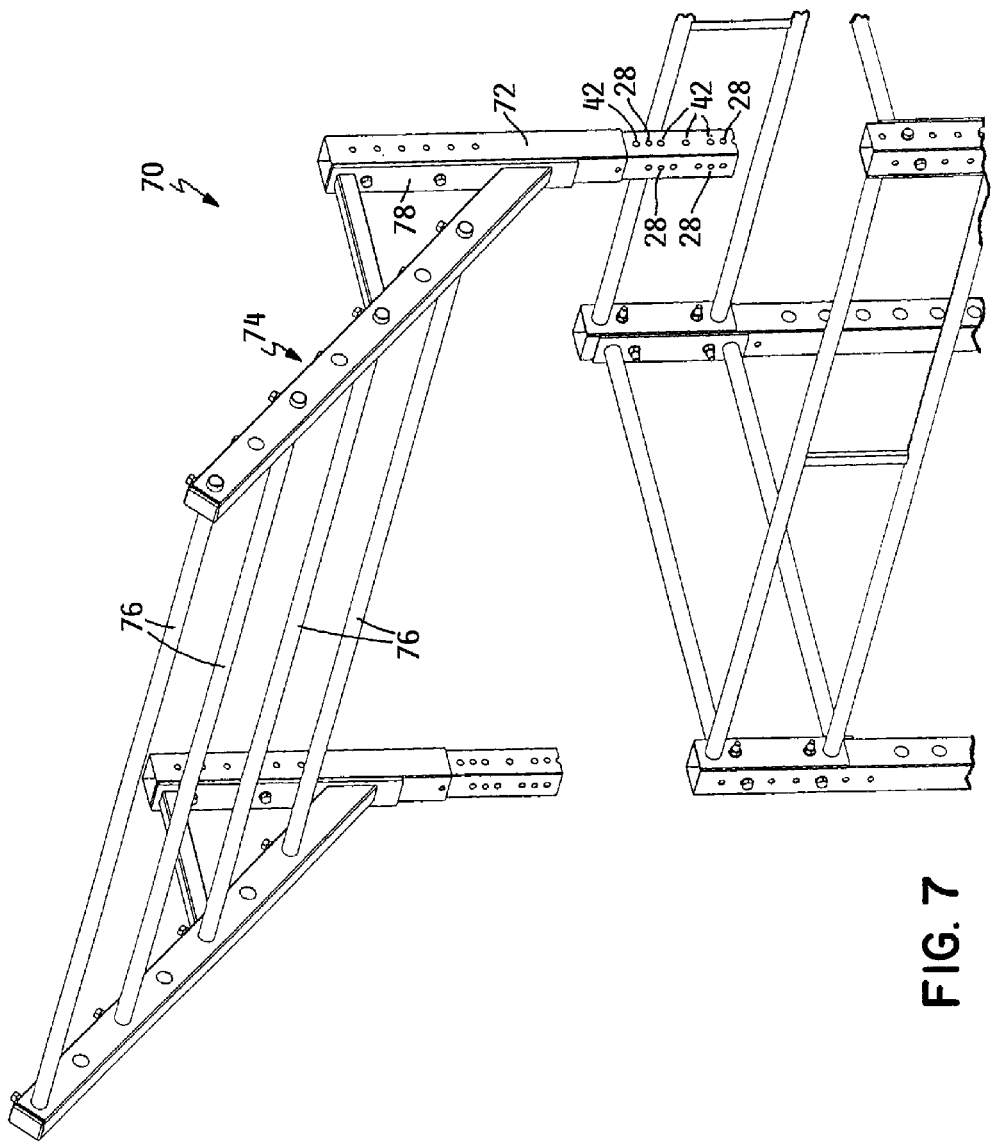
FIG. 7 is a perspective view of the upward frame extension of FIG. 6, but particularly showing the frame extension pulled away from the pair of vertical uprights of the frame to illustrate that the same interference fit protrusions as are used in FIG. 4 to couple together the upper and lower sections of the structural member forming each upright of the frame are also used on the bottom of a pair of extension sections of the frame extension to couple the frame extension to the upper sections of the pair of vertical uprights of the frame.

Lower end 80 of extension section 72 has a plurality of small holes 42 that are identical to the holes used in the upper end of upper section 20. Small holes 42 in lower end 80 of extension section 72 will align with the small holes 42 in the upper end of upper section 20 when the two pieces are telescopically connected together as shown in FIG. 7. This alignment of small holes 42 is required to allow cross members 6 to be subsequently bolted to frame 2 even when frame 2 carries frame extension 70. In addition, the upper ends of extension sections 72 of frame extension 70 have similar small holes 82 to allow mounting flanges 78 of bar array 74 to be bolted thereto. FIG. 7 shows mounting flanges 78 bolted to extension sections 72 of frame extension 70 while FIG. 8 is the same view as FIG. 7 but with bar array 74 having been pulled away from extension sections 72.

Desirably, extension sections 72 of frame extension 70 use the same type of raised or outwardly extending protrusions 28 on each of the four sides of lower end 80 of extension sections 72. Because the sides of lower end 80 of extension sections 72 carry small holes 42 that are used for the passage of the bolts that secure cross members 6 to uprights 4, protrusions 28 have to be spaced in between the small holes 42. The two protrusions 28 on each of the two visible sides of lower end 80 of the extension members can thus be seen in FIG. 8 interspersed among the small holes 42. Similarly located protrusions (not shown) are present on the other two hidden sides in FIG. 8 of lower end 80 of the extension members. Protrusion members 28 are designed to form the same greater than hand pressure interference fit as was described earlier herein in conjunction with the assembly of sections 18 and 20 of upright 4 forming one upright 4 of frame 2.

Figures 6, 9:
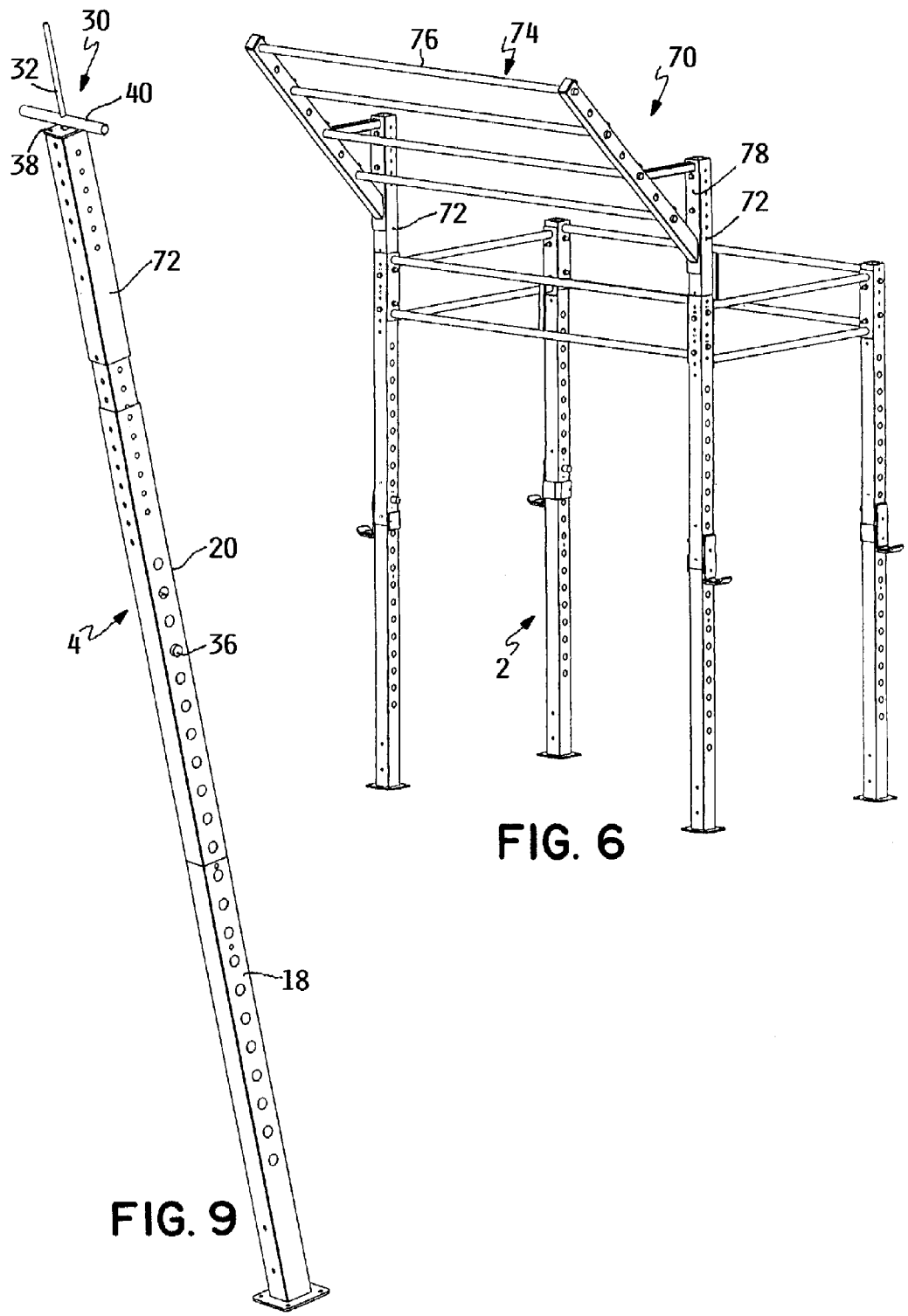
FIG. 6 is a perspective view of the weight lifting frame of FIG. 1, but particularly illustrating an upward frame extension that has been added to a pair of the vertical uprights of the frame with the frame extension additionally providing on the frame an inclined array of pull up bars at different vertical heights.
FIG. 9 is a perspective view illustrating that the extension sections of the frame extension are assembled to the uprights of the frame before the respective uprights of the frame are laterally linked together to complete the frame and before the array of pull up bars is installed on the extension sections of the frame extension to thereby allow an assembly tool like that of FIG. 5 to fully telescopically assemble the structural members of the frame extension onto the uprights of the frame.

An assembly tool 30 like that previously described in conjunction with FIGS. 5A-5C hereof will be used to cause lower ends 80 of extension sections 72 to be fully telescopically inserted into the upper ends of uprights 4. Assembly tool 30 will work the same way as before except that anchor pin 36 will be inserted into one of large holes 8 in the length of upper section 20 of upright 4 after sections 18 and 20 have first been assembled together. This is illustrated in FIG. 9. After such insertion of anchor pin 36, handle 40 of assembly tool 30 is rotated in the same way as described earlier to push down on thrust plate 38 to force extension section 72 downwardly until lower end 80 of extension section 72 is fully telescopically inserted into the upper end of upper section 20 of upright 4. Just as assembly tool 30 can be used for installation of extension sections 72 of frame extension 70, disassembly tool 44 previously described with respect to FIGS. 10 and 11 can be used to disassemble extension sections 72 if need be. It may be necessary to use shorter lengths of threaded rods 32 and 46 in tools 30 and 44 when such tools are used in assembling or disassembling relatively short extension sections 72 on uprights 4.

It should be apparent that the assembly and disassembly tools described above can only be used when cross members 6 that unite uprights 4 together are disassembled from uprights 4 in order to allow the tools to be inserted down into the open cross-section of upper section 20. If such were not the case, the bolts used to secure cross members 6 would interfere with the rods 32 and 46 of the tools. Similarly, use of the tools to secure or remove extension sections 72 of frame extension 70 to or from uprights 4 requires that bar array 74 including the mounting flanges 78 thereof be pulled off extension sections 72 of frame extension 70 for the same reason, namely to avoid interference between the rods 32 and 46 of the tools and the bolts used to bolt mounting flanges 78 of bar array 74 to extension sections 72.

The same advantages described for use of the protrusion type interference fit with respect to uprights 4 of frame 2 pertain to frame extension 70. An extremely rigid and tight joint can be achieved through the use of the leverage applying assembly 30. Yet, tool 30 is removable after the joint is created by lifting it out of the conjoined sections. Once so removed, tool 30 does not interfere with or obstruct any of the patterns of small holes 42 or 82 that subsequently receive other assembly bolts that are needed to assemble the complete frame 2.

Various modifications of this invention will be apparent to those skilled in the art. For example, uprights 4 as disclosed herein are not limited to the particular frame 2 shown herein but can be used to form other types of weight lifting frames. For example, rather than a frame with four uprights forming a power cage, a frame with only two uprights could be advantageously formed using uprights 4 disclosed herein. Moreover, many types of frame extensions 70 could advantageously use a pair of frame extensions 72 of the type disclosed herein. Accordingly, the scope of this invention is to be limited only by the appended claims.

The invention claimed is:

1. An exercise equipment frame, which comprises:
    (a) a pair of spaced, parallel, vertically extending uprights that are fixedly secured to one another by at least one cross member, wherein each upright comprises a hollow tube, wherein each upright has at least one pair of opposite sides having matching arrays of vertically spaced apart holes carried thereon, wherein the holes provide a series of a plurality of vertically spaced apart hole pairs on each upright with each hole pair comprising a first hole on one side of each upright and a second hole on the opposite side of each upright with the first and second holes of each hole pair being at the same vertical elevation along each upright;
    (b) a pair of elongated horizontal attachment members passing through vertically corresponding hole pairs on the pair of uprights; and
    (c) wherein each upright is formed from at least two separable sections that separate from one another at a vertical location between upper and lower ends of the series of hole pairs on each upright, one of the two separable sections of each upright having a reduced size end that is telescopically interfit into one end of the other section of each upright to couple the two sections of each upright together, the reduced size end of the one section of each upright having hole pairs therein that will align with and form continuations of the hole pairs in the one end of the other section of each upright when the telescopically interfitting connection between the two sections of each upright is fully made, and wherein the reduced size end of the one section of each upright and the one end of the other section of each upright have an interference fit therebetween when the sections of each upright are telescopically interfit with one another which interference fit is sufficiently tight such that the sections of each upright are substantially rigidly connected to one another; and an assembly tool for applying leverage for forcing the sections of each upright together to make the telescopically interfitting connection therebetween, the sections of each upright when being assembled by the assembly tool defining a stationary section and a movable section that is forcibly slid towards the stationary section by the assembly tool to make the telescopically interfitting connection therebetween.

2. The frame of claim 1, wherein the horizontal attachment members comprise mounting pins for mounting a pair of bar supports to vertically corresponding hole pairs on the pair of uprights with the bar supports being shaped for releasably retaining a grip bar of a barbell atop thereof.

3. The frame of claim 1, wherein the horizontal attachment members comprise threaded attachment members for securing the cross member to the uprights.

4. The frame of claim 1, wherein the assembly tool comprises:
    (a) a threaded rod that is partially insertable within the sections forming each upright;
    (b) an anchor pin received within a selected hole pair in the stationary section of each upright for holding one end of the threaded rod in a non-rotatable manner within the stationary section of each upright, the threaded rod having a length sufficient to extend from the anchor pin all the way through the movable section of each upright to have a portion which is exterior to the movable section of each upright; and
    (c) a rotatable handle threaded onto the exterior portion of the threaded rod to permit threaded motion of the handle up and down the length of the exterior portion of the rod as the handle is rotated on the exterior portion of the rod, the handle coacting with a proximal end of the movable section of each upright to push down on the movable section of each upright to force the sections of each upright together to achieve the telescopic interfitting connection between the sections of each upright when the handle moves along the length of the rod in a direction towards the proximal end of the movable section of each upright.

5. The frame of claim 4, wherein a thrust plate is sandwiched between the handle and the proximal end of the movable section of each upright, the thrust plate bearing against the proximal end of the movable section of each upright and the handle bearing against the thrust plate to move the thrust plate towards the proximal end of the movable section of each upright as the handle is moved towards the proximal end of the movable section of each upright.

6. The frame of claim 4, wherein the threaded rod and anchor pin are removable from within the sections of each upright forming each upright after the telescopic interfitting connection is made so that the hole pairs in the sections forming each upright are unobstructed to the passage of the attachment members after assembly of the sections of each upright to one another.

7. The frame of claim 1, wherein the reduced size end of the one section of each upright and a remaining length of the one section of each upright form a substantially horizontal lip where the reduced size end of the one section of each upright and the remaining length of the one section of each upright join together, wherein the substantially horizontal lip on the one section of each upright comes into an abutting, face-to-face engagement with a substantially horizontal end surface at the one end of the other section of each upright when the telescopically interfitting connection is fully made.

8. The frame of claim 1, wherein a nominal lateral gap is provided between a laterally outwardly facing periphery of the reduced size end of the one section of each upright and a laterally inwardly facing periphery of the one end of the other section of each upright when the telescopically interfitting connection is made, and wherein the interference fit is created by a plurality of circumferentially and vertically spaced, laterally extending raised protrusions carried on at least one of the peripheries which protrusions have a lateral extent that exceeds the nominal lateral gap.

9. The frame of claim 8, wherein the lateral extent of the protrusions exceeds the nominal lateral gap by at least approximately 10%.

10. The frame of claim 8, wherein the protrusions extend laterally outwardly from the periphery of the reduced size end of the one section of each upright.

11. The frame of claim 10, wherein the laterally outwardly extending protrusions comprise a first pair of protrusions carried on each side of the at least one pair of opposite sides of the one section of each upright, and wherein the first pair of protrusions on each side of the at least one pair of opposite sides are vertically spaced apart to fit in between the vertical spacing of various of the holes carried on each side of the at least one pair of opposite sides.

12. The frame of claim 11, wherein the laterally outwardly extending protrusions comprise a second pair of protrusions carried on each side of a second pair of opposite sides of the one section of each upright which second pair of opposite sides are solid without having any vertically spaced apart holes carried thereon, and wherein the second pair of protrusions on each side of the second pair of opposite sides are vertically spaced apart at elevations above and below that of the elevations of the first pair of protrusions.

13. An exercise equipment frame, which comprises:
   (a) a pair of spaced, parallel, vertically extending uprights that are fixedly secured to one another by at least one cross member, wherein each upright comprises a hollow tube, wherein each upright has at least a pair of opposite sides having matching arrays of vertically spaced apart holes carried thereon, wherein the holes provide a series of a plurality of vertically spaced apart hole pairs on each upright with each hole pair comprising a first hole on one side of each upright and a second hole on the opposite side of each upright with the first and second holes of each hole pair being at the same vertical elevation along each upright;
   (b) a pair of elongated horizontal attachment members passing through vertically corresponding hole pairs on the pair of uprights;
   (c) wherein each upright is formed from at least two separable sections that separate from one another at a vertical location between upper and lower ends of the series of hole pairs on each upright, one of the two separable sections of each upright having a reduced size end that is telescopically interfit into one end of the other section of each upright to couple the two sections of each upright together, the reduced size end of the one section of each upright having hole pairs therein that will align with and form continuations of the hole pairs in the one end of the other section of each upright when the telescopically interfitting connection between the two sections of each upright is fully made, and wherein the reduced size end of the one section of each upright and the one end of the other section of each upright have an interference fit therebetween when the sections of each upright are telescopically interfit with one another; and
   (d) an assembly tool for applying leverage for forcing the sections of each upright together to make the telescopically interfitting connection therebetween, the sections of each upright when being assembled by the assembly tool defining a stationary section and a movable section that is forcibly slid towards the stationary section by the assembly tool to make the telescopically interfitting connection therebetween, the assembly tool comprising:
      (i) an elongated member having a first end that is temporarily affixed by an anchor mechanism to the stationary section of each upright when the assembly tool is in use and a second end that carries a movable member that temporarily engages with a portion of the movable section of each upright when the assembly tool is in use; and
      (ii) a manually operable actuator that is selectively movable by a user who is assembling each upright using the assembly tool, wherein movement of the actuator by the user slides the movable member towards the first temporarily affixed end of the elongated member to thereby cause the movable member to push the movable section of each upright towards the stationary section of each upright to make the telescopically interfitting connection therebetween.

14. The frame of claim 13, wherein the anchor mechanism comprises an anchor pin received within at least one hole of a selected hole pair in the stationary section of each upright.

15. The frame of claim 13, wherein the temporary engagement of the movable member comprises an abutting engagement of the movable member with one end of the movable section of each upright.

16. The frame of claim 13, wherein the elongated member is a rod having a threaded portion thereon, the anchor mechanism serving to hold the rod in a non-rotatable manner relative to the stationary and movable sections of each upright when the assembly tool is in use.

17. The frame of claim 16, wherein the movable member is a threaded rotatable member that is threaded onto the threaded portion of the rod for movement up and down the threaded portion as the rotatable member is turned in opposite directions.

* * * * *